United States Patent
Meyers et al.

(10) Patent No.: US 10,554,691 B2
(45) Date of Patent: Feb. 4, 2020

(54) SECURITY POLICY BASED ON RISK

(71) Applicant: Trend Micro Incorporated, Tokyo (JP)

(72) Inventors: Russell Meyers, Austin, TX (US);
Scott Rivers, Austin, TX (US);
Matthew Laswell, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 287 days.

(21) Appl. No.: 15/388,876

(22) Filed: Dec. 22, 2016

(65) Prior Publication Data

US 2017/0104790 A1    Apr. 13, 2017

Related U.S. Application Data

(63) Continuation of application No. PCT/US2014/044570, filed on Jun. 27, 2014.

(51) Int. Cl.
*H04L 29/06* (2006.01)
*G06F 21/60* (2013.01)

(52) U.S. Cl.
CPC .............. *H04L 63/20* (2013.01); *G06F 21/60* (2013.01); *H04L 63/10* (2013.01); *H04L 63/1433* (2013.01)

(58) Field of Classification Search
CPC ..... H04L 63/20; H04L 63/1433; H04L 63/10; G06F 21/60
See application file for complete search history.

(56) References Cited

U.S. PATENT DOCUMENTS

| | | | |
|---|---|---|---|
| 7,752,125 B1 | 7/2010 | Kothari et al. | |
| 2007/0143851 A1* | 6/2007 | Nicodemus | G06F 11/3495 726/25 |
| 2009/0119740 A1* | 5/2009 | Alperovitch | H04L 63/1425 726/1 |
| 2010/0114634 A1 | 5/2010 | Christiansen et al. | |
| 2011/0225656 A1* | 9/2011 | Gruper | H04L 63/1433 726/25 |
| 2013/0227683 A1* | 8/2013 | Bettini | G06F 21/57 726/22 |
| 2013/0340084 A1 | 12/2013 | Schrecker et al. | |
| 2014/0090071 A1* | 3/2014 | Salehie | G06F 21/50 726/25 |
| 2014/0109175 A1* | 4/2014 | Barton | H04L 63/0807 726/1 |
| 2014/0157355 A1* | 6/2014 | Clancy, III | G06F 21/53 726/1 |
| 2014/0189098 A1* | 7/2014 | MaGill | H04L 63/1425 709/224 |

(Continued)

FOREIGN PATENT DOCUMENTS

WO    WO 2013/059520 A1    4/2013

*Primary Examiner* — Cheng-Feng Huang
(74) *Attorney, Agent, or Firm* — Okamoto & Benedicto LLP (57) ABSTRACT

A security system for a network maintains security policies that each includes a risk level. The security system maintains groups, with each group being associated with a security policy. Assets of the network are assigned to groups according to the risk assessments of the assets. Security policy associated with a group is enforced against network traffic of an asset when the asset is assigned to the group.

12 Claims, 4 Drawing Sheets

(56) References Cited

U.S. PATENT DOCUMENTS

2014/0201807 A1\* 7/2014 White .................... G06F 21/53
726/1
2016/0205143 A1\* 7/2016 Bryson ................ H04L 63/205
726/1

\* cited by examiner

SECURITY POLICY BASED ON RISK

CROSS-REFERENCE TO RELATED APPLICATION

This application is a continuation of International Application No. PCT/US2014/044570, with an International Filing Date of Jun. 27, 2014, which is incorporated herein by reference in its entirety.

BACKGROUND

Maintenance of a network to ensure secure and authorized communications can be a challenge. A network security device, such as an intrusion prevention system ("IPS"), an intrusion detection system ("IDS"), or a next generation firewall ("NGFW"), can be deployed in a network to protect the network from unauthorized communication. For example, a security device can inspect content of data packets communicated through the network. The security device can also enforce security policies. For example, a security device can block traffic going to or coming from a particular Internet protocol ("IP") address.

DETAILED DESCRIPTION

In the following description and figures, some example implementations of network security apparatus, network security systems, and/or methods of maintaining network security are described. Static security constructions, such as network security policies based on Ethernet port, virtual local access network ("WAN"), or IP-based classless inter domain routing ("CIDR"), can restrain security by being restrictive based on individual asset or encompassing one-size fits all security policies. For example, bring-your-own-device ("BYOD") policies can receive any number of devices where a denial or restriction across all devices may not satisfy the customer's needs or provide robust and individualized security. Also, a static security construct is commonly only reactive when the administrator manually updates the network segments individually with a security policy. For example, a single network device in a network subnet of 255 addresses may visit a particular website, download malware, and potentially become infected, thereby increasing its risk relative to other devices. The security policy on the device in that example could be statically changed by an administrator.

Various examples described below relate to setting a security policy for an asset based on risk. For example, an aggressive policy can be set for traffic of a risky device and a less-aggressive policy can be set for traffic of a device having a lower risk than the high risk device. An asset, as used herein, is any compute device capable of communication via a network. Described herein is a framework to allow for customizable classes of devices where the risk assessment of the devices can guide network traffic to an associated security policy based on the level of risk associated with the device. Risk can be defined (e.g. based on input from a user) as a relative assessment of threat and/or harm to the network. For example, risk can be defined based on vulnerability, exploitation of the vulnerability (such as history and potential of exploitation), and the harm of the vulnerability (such as the magnitude of harm). For another example, a computer with public information may have a lower assessment of risk compared to a computer with private information because the potential harm is greater for the release of private information than public information. A risk assessment can be defined and assigned to a network host name or IP address associated with an asset. Risk levels can be applied across configurations and operating context and security can be enforced based on groups (e.g. classes) of devices. In particular, a plurality of groups can be established where each group is associated with a security policy. For example, group A, group B, and group C can be correlated to a high (i.e. strict), medium (i.e. normal), and low (i.e. flexible) security policy respectively, where an asset can move among groups A, B, and C as the risk assessment of the asset changes.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, configure, and/or modify."

Figure 1:
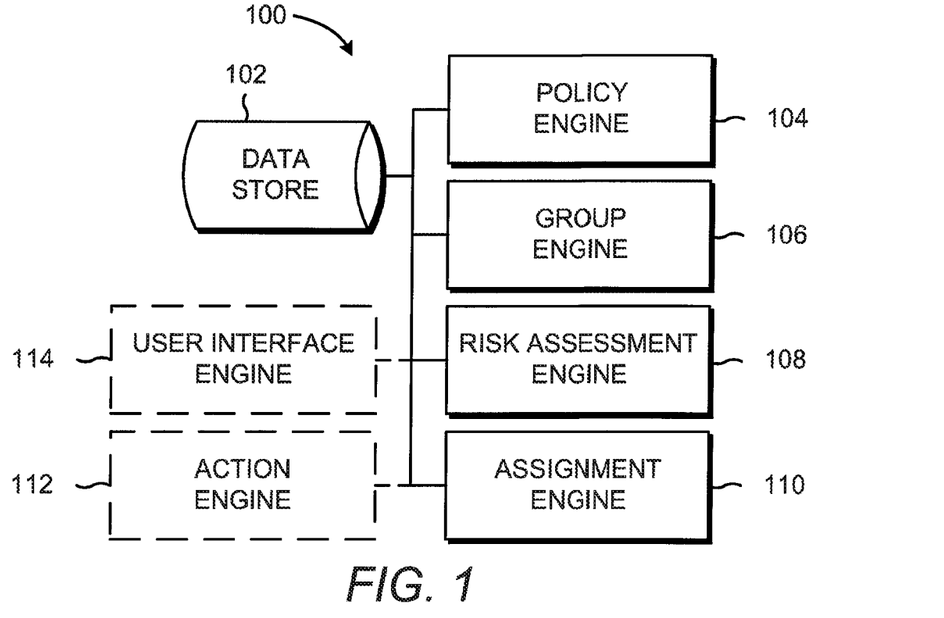
FIGS. 1 and 2 are block diagrams depicting example security systems.
Figure 2:
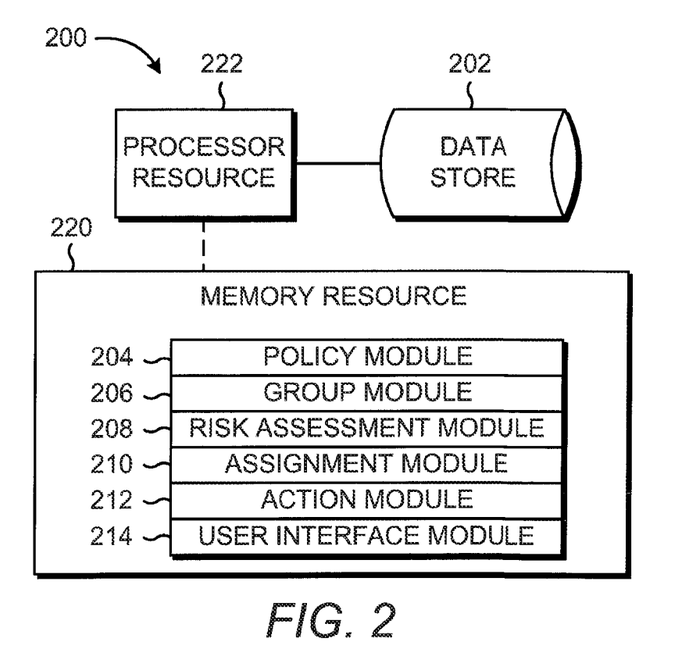

FIGS. 1 and 2 are block diagrams depicting example security systems 100 and 200. Referring to FIG. 1, the example security system 100 of FIG. 1 generally includes a data store 102, a policy engine 104, a group engine 106, a risk assessment engine 108, and an assignment engine 110. In general, the group engine 106 maintains groups based on the security policies maintained by the policy engine 104, and network traffic (i.e. communications over the network) is assigned to a group by the assignment engine 110 based on the risk assessment of an associated asset of the network. As shown in FIG. 1, the system 100 can also include an action engine 112 to enforce the security policies and a user interface engine 114 to receive user input to customize the security policies based on desires of a user of the system 100.

The policy engine 104 represents any appropriate circuitry or combination of circuitry and executable instructions to maintain a plurality of security policies. A security policy is a construct that identifies access to applications or resources of the network. A security policy can include a filter and an action to perform based on the filter. For example, the security policy can be described by a data structure with a list of accessible services and/or ports allowed for communication. The filter can include a communication characteristic (such as packet header information, communication rate, protocols, and other characteristics discoverable by packet inspection) and/or a resource characteristic (such as version information of an application, a component or functionality of an application, and data transfer limits for a service request, etc.). A security policy can include any appropriate security conditions for enforcement by performing a security action on a set of network traffic (e.g. packets of a network communication between assets). Example security actions include permit, block, notify, capture traffic for analysis, quarantine, limit traffic rate, and the like.

A security policy includes a risk level associated with the security policy. The policy engine 104 maintains the risk level associated with the security policy. For example, the policy engine 104 can receive user input to define a security policy and the risk level associated with the security policy. The risk level is any appropriate character, value, number, range, percentage, category, label, or other identifier to indicate at which amount of riskiness the security policy should be applied. For example, the risk level is a categorical division among combinations of asset configurations and operation context. An asset configuration can include the operating system ("OS") of the asset, an application executing on the asset, or other component of the asset. An operation context can include the location of the asset, communication history (e.g. the amount and/or class of communication received by the asset), protocols and/or ports used for communications, and other particulars regarding communication among assets.

The group engine 106 represents any appropriate circuitry or combination of circuitry and executable instructions to maintain a plurality of groups. A group represents any appropriate category, label, range, identifier, and/or container to associate with a risk level. A group associated with a security policy includes a risk level. For example, a group can be associated with a "strict" security policy when the group is to contain "high risk" traffic (i.e. traffic from assets identified as "high risk") where "high risk" traffic is identified based on a "high risk" level of risk of a plurality of possible risk levels. The group engine 106 can maintain the plurality of groups based on a plurality of risk levels. A group is paired, mapped, or otherwise coupled with a risk level, and, in turn, a security policy associated with that risk level. The group engine 106 can maintain a relationship between the group and the risk level associated with the group. For example, a group may be defined to enforce a policy of assets that reach a score of 75 out of 100 or greater on a vulnerability scale, and the group can be modified to encompass more assets based change of minimum score of the group to 70 out of 100.

The group engine 106 can maintain a map of the plurality of security policies to the plurality of groups. For example, the group engine 106 can maintain a one-to-one mapping between the security policies and the groups. For another example, the group engine 106 can change the one-to-one mapping where a certain level of assets can be temporarily changed to higher risk level, creating a many-to-one mapping. The map can be defined by the user to establish the relationship between a group and a security policy. The plurality of groups may change based on changes to the plurality of security policies maintained by the policy engine 104.

The risk assessment engine 108 represents any appropriate circuitry or combination of circuitry and executable instructions to receive a risk assessment of an asset. A risk assessment represents any appropriate label, category, value, or other identifier to identify the riskiness of an asset. For example, the risk assessment can be an evaluation score of the riskiness assigned to the asset based on a configuration of the asset and a context of operation of the asset, such as an aggregation of relative scores of vulnerabilities and normalized within a range from zero to one hundred. For another example, a risk assessment can be a vulnerability class associated with the configuration of the asset and the operating context of the device are aggregated and relatively normalized, such as against other devices of the network or device configurations known to a security community. The assessment score can associate the risk assessment with an asset based on one of a network host name and an IP address. In general, the risk assessment is comparable to the risk level, and, if not similarly defined, can be translated, computed, or otherwise adapted to compare the risk assessment against the risk levels defining the groups. In one example, the risk assessment and the risk level can be derived from a risk scoring system defined by a user.

A risk assessment can be provided by an administrator, a security feed, or an external data source. The administrator can provide the risk assessment directly such as via a management graphical user interface ("GUI") or programmatically via an application programming interface ("API"). A security feed can provide a risk assessment made available with a product offering, such as a feed from a reputation service providing a reputation score based on a reputation scoring system. An external source can make data available in a public forum, such as a message board or publically accessible repository. This risk assessment data can be dynamic and may change frequently over time potentially increasing or decreasing the relative risk of the asset. When risk assessments are made available, an administrator would then be allowed to configure a set of network security device enforcement policies against this dynamic risk assessment data. The risk assessment engine 108 can notify the assignment engine 110 when the risk assessment of the asset changes. For example, the risk assessment of an asset and the risk level of a policy can be scores of a risk scoring system (such as a range of evaluation scores from 1 to 10 based on security vulnerability) where the scores can be updated dynamically, or based on an event. As risk scores change, updates are made available in real time to the network security devices enforcing security policies, potentially changing the enforcement action. For example, the risk assessment of an asset may change from a relative medium risk to a relative high risk and may be deserving of a stricter security policy than the security policy previously enforced on the asset. The risk assessment can be provided and/or received based on a schedule or based on an event, such as a news release from a rich site summary ("RSS") security feed.

The assignment engine 110 represents any appropriate circuitry or combination of circuitry and executable instructions to assign traffic associated with an asset to a group. The assignment by the assignment engine 110 is based on risk. For example, the assignment engine 110 can assign network traffic to a group when the risk assessment of the asset satisfies the risk level associated with the group. The risk used to make the assignment can be based on the risk assessment of the transmitting device and/or the receiving device. For example, the assignment engine 110 can assign network traffic to a group of a plurality of groups based on a risk assessment of the asset that is to receive (e.g. traffic going to the asset) or transmit (e.g. traffic coming from the asset) the network traffic.

The assignment engine 110 can assign traffic based on information associated with the traffic. For example, the assignment engine can parse the headers of the traffic (or otherwise receive the header information associated with the traffic) and identify the source and destination of the traffic. For another example, the network security device may perform a deep packet inspection to identify the characteristics of the traffic based on the payload of the network traffic. The assignment engine 110 can match the risk assessment with an asset based on one of a network host name and an IP address. The assignment engine 110 can make assignments and reassignments of traffic dynamically, such as when the risk assessment changes based on monitoring the asset, a security feed, or other source of security data.

The action engine 112 represents any appropriate circuitry or combination of circuitry and executable instructions to cause a security policy to apply to the traffic. The security policy applied to a set of network traffic is the security policy associated with the group to which the set of network traffic is assigned. A security policy can be enforced in various ways based on the actions available to the system 100, such as blocking, permitting, isolating, rerouting, capturing, and the like. For example, various services may be denied for communication purposes, such as a particular social media communication or the ability to ping when the asset is identified as highly risky relative to other assets of the network. Blocking communications by port or data inspection can restrain vulnerabilities from exploitation. For another example, specific services or application functionality can be restricted, such as denial of transfer via file transfer protocol ("FTP") or limitations for uploading a particular size or class of document. Enabling enforcement to occur dynamically based on risk of the asset (which may change at any given moment) allows for the IPS, NFGW, or other network security device to adjust enforcement policies dynamically.

The user interface engine 114 represents any appropriate circuitry or combination of circuitry and executable instructions to receive user input to define risk, a risk level, and/or a map among the plurality of security policies and the plurality of groups. For example, the user interface engine 114 can receive user input associated with organizing the groups where the user input is used to maintain a map of the plurality of security policies to the plurality of groups based on a user-defined division of risk levels. The user input can include a risk level and a security policy to associate with the risk level.

The data store 102 can contain information utilized by the engines 104, 106, 108, 110, 112, and 114. For example, the data store 102 can store a security policy, a risk level, a risk assessment, and a network packet.

FIG. 2 depicts the example security system 200 can be implemented on a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions can implement the system 200 when executed by the processor resource 222. The set of instructions stored on the memory resource 220 can be represented as a policy module 204, a group module 206, a risk assessment module 208, an assignment module 210, an action module 212, and a user interface module 214. The processor resource 222 can carry out a set of instructions to execute the modules 204, 206, 208, 210, 212, 214, and/or any other appropriate operations among and/or associated with the modules of the system 200. For example, the processor resource 222 can carry out a set of instructions to maintain a plurality of groups based on a plurality of risk levels and assign network traffic to a group of the plurality of groups based on a risk assessment of an asset that is to receive or transmit the network traffic. The policy module 204, the group module 206, the risk assessment module 208, the assignment module 210, the action module 212, and the user interface module 214 represent program instructions that when executed function as the policy engine 104, the group engine 106, the risk assessment engine 108, the assignment engine 110, the action engine 112, and the user interface module 114 of FIG. 1, respectively.

The processor resource 222 can be any appropriate circuitry capable of processing (e.g. compute) instructions. For example, the processor resource 222 can be a central processing unit ("CPU") that enables maintaining security by fetching, decoding, and executing modules 204, 206, 208, 210, 212, and 214. Example processor resources 222 include CPUs, semiconductor-based microprocessors, application specific integrated circuits ("ASIC"), a field-programmable gate array ("FPGA"). The processor resource 222 can be one or multiple processing elements capable of retrieving instructions from the memory resource 220 and executing those instructions. Such multiple processing elements can be integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine readable, such as computer readable. The medium can be an electronic, magnetic, optical, or other physical storage device that is capable of containing (i.e. storing) executable instructions. The memory resource 220 can be said to store program instructions that when executed by the processor resource 222 implements the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein.

In the discussion herein, the engines 104, 106, 108, 110, 112, and 114 of FIG. 1 and the modules 204, 206, 208, 210, 212, and 214 of FIG. 2 have been described as a circuitry or a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions. The instructions residing on the memory resource 220 can comprise any set of instructions to be executed directly (such as machine code) or indirectly (such as scripts) by the processor resource 222.

In one example, the executable instructions can be part of an installation package that when installed can be executed by the processor resource 222 to implement the system 200. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
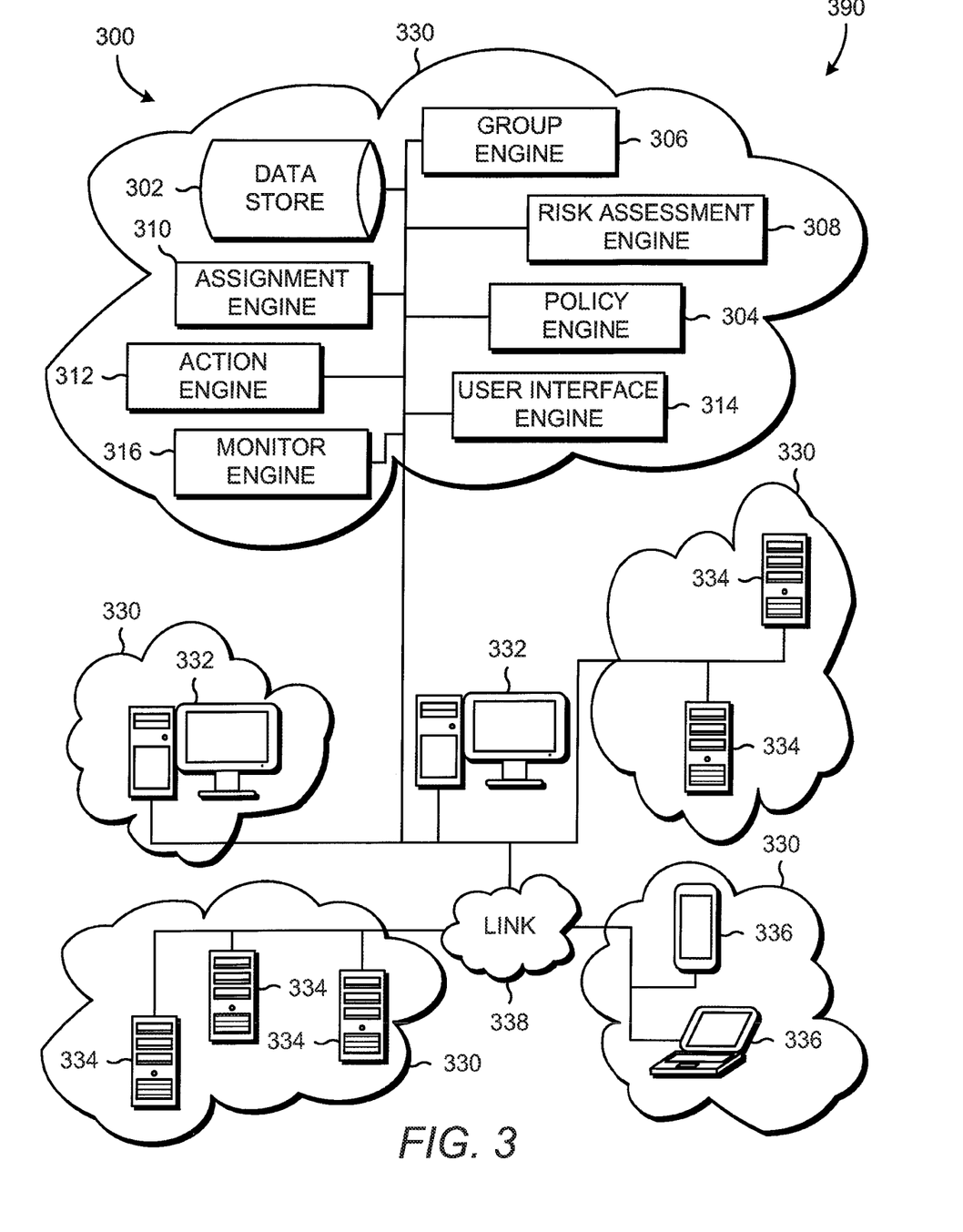
FIG. 3 depicts an example environment in which various security systems can be implemented.

FIG. 3 depicts example environments in which various example security systems can be implemented. The example environment 390 is shown to include an example system 300 for maintaining security. The system 300 (described herein with respect to FIGS. 1 and 2) can represent generally any combination of circuitry and executable instructions to maintain security of a network. The system 300 can include a policy engine 304, a group engine 306, a risk assessment engine 308, an assignment engine 310, an action engine 312, and a user interface engine 314 that are the same as the policy engine 104, the group engine 106, the risk assessment engine 108, the assignment engine 110, the action engine 112 and the user interface engine 114 of FIG. 1, respectively, and the associated descriptions are not repeated for brevity. The system 300 can include a monitor engine 316 and the engines 304, 306, 308, 310, 312, 314, and 316 can be integrated into a compute device, such as a network security device 332. The engines 304, 306, 308, 310, 312, 314, and 316 can be integrated via circuitry or as installed instructions into a memory resource of the compute device.

The monitor engine 316 represents any appropriate circuitry or combination of circuitry and executable instructions to monitor an asset and/or a source of security data, such as a security feed. The monitor engine 316 can provide events to the system 300 based on changes to a data source used in applying a risk assessment. For example, a user may define risk assessment based on a set of applications and the applications of an asset may change to a different group (e.g. upgrade to a new version of an application). In that example, the monitor engine 316 can send a notification to the assignment engine based on the event of a change in configuration and/or context of the asset. For another example, the monitor engine 316 can forward an event based on an update form a security feed. The monitor engine 316 (in conjunction with the inspection done by the assignment engine 308 or a separate network security device 332) can provide an event based on the activity of the asset, such as communications with an unauthorized application or over an unauthorized port based on a security policy.

The example environment 390 can include assets, such as network security devices 332, service devices 334, and user devices 336. The network security devices 332 represent generally any compute devices configured to monitor network traffic (e.g. communications over a network 330 or between multiple networks 330) and/or enforce a security policy on the network 330. Examples of a network security device 332 include an IPS, an IDS, and an NFGW. A first set of security policies can be developed and/or modified on a network security device 332. For example, a strict or aggressive security policy can be created on stored on a network security device 332 to enforce on mobile devices, such as user devices 336. The network security devices 332 can receive and/or analyze communications among service devices 334 and user devices 336. The service devices 334 represent generally any compute devices configured to respond to or forward a network request received from a user device 336, whether virtual or real. For example, the service device 332 can provide a network packet in response to a request for a page of website. The user devices 336 represent generally any compute devices configured with a browser to communicate a network request and receive and/or process the corresponding responses. For example, the user device 336 can receive the network packet from the service device 334 and utilize the payload of the packet to display an element of the page on the user device 336. Example implementations of the system 300 can be a standalone deployment included in a network security device 332 or a centrally managed deployment of multiple network security devices 332.

The compute devices can be located on separate networks 330 or part of the same network 330. The example environment 390 can include any appropriate number of networks 330 and any number of the networks 330 can include a cloud compute environment. For example, networks 330 can be distributed networks comprising virtual computing resources or "clouds." Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources.)

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

By way of example, the devices 332, 334, and 336 communicate with each other and other components with access to a communication networks or combination of communication networks via a communication protocol or multiple protocols. A protocol can be a set of rules that defines how nodes of the communication networks interact with other nodes. Further, communications between network nodes can be implemented by exchanging discrete packets of data or sending messages. Packets can include header information associated with a protocol (e.g., information on the location of the network node(s) to contact) as well as payload information Referring to FIGS. 1-3, the engines 104, 106, 108, 110, 112, and 114 of FIG. 1 and/or the modules 204, 206, 208, 210, 212, and 214 of FIG. 2 can be distributed across devices 332, 334, 336, or a combination thereof. For example, the system 300 can be distributed across multiple virtual IPS devices of the network. For another example, the interface engine 314 can be located on a user device 336 to provide input to the engines 304, 306, 308, and 310 on a service device 334, and engines 304, 306, 308, and 310 configure the network security device 332 to perform the operations of the engines 312 and 316, The engine and/or modules can complete or assist completion of operations performed in describing another engine and/or module. For example, the assignment engine 310 of FIG. 3 can request, complete, or perform the methods or operations described with the assignment engine 110 of FIG. 1 as well as the policy engine 104, the group engine 106, the risk assessment engine 108, and the action engine 112 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. For example, the modules 204, 206, 208, 210, 212, and 214 can be executed by a processor resource, such as processor resource 222, or a combination of processor resources to cause a network security device to perform the functions associated with the descriptions of module 204, 206, 208, 210, 212, and 214. The engines of the system 300 can perform example methods described in connection with FIGS. 4-6.

Figure 4:
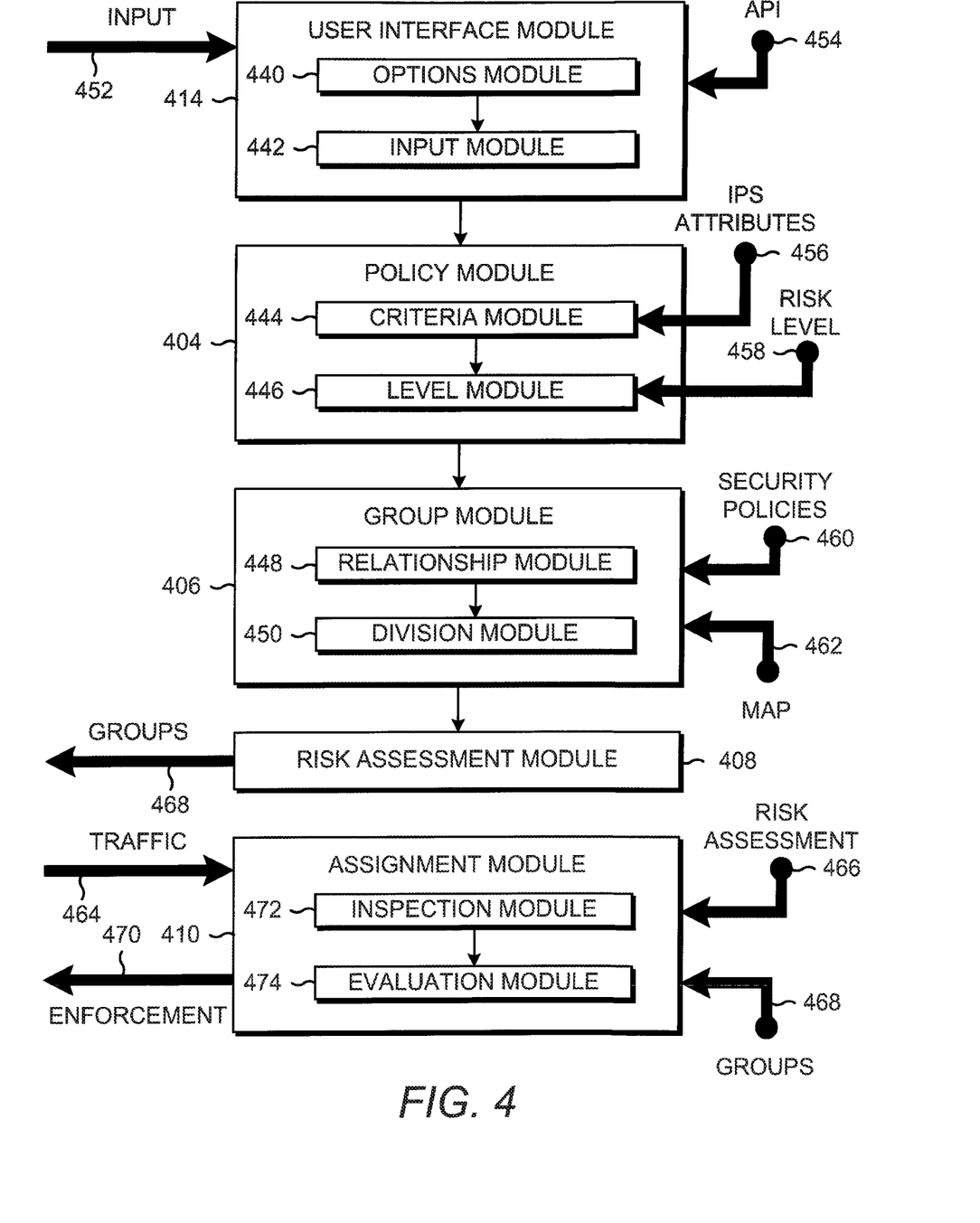
FIG. 4 depicts example modules used to implement example security systems.

FIG. 4 depicts example modules used to implement example security systems. Referring to FIG. 4, the example modules of FIG. 4 generally include a user interface module 414, a policy module 404, a group module 406, a risk assessment module 408, and an assignment module 410 that can be the same as the user interface module 214, the policy module 204, the group module 206, the risk assessment module 208, and the assignment module 210 of FIG. 2, respectively. The example modules of FIG. 4 can be implemented on a network security device.

The user interface module 414 can receive input 452 from a user, such as via an API 454, to define the risk levels 458 and security policies 460 to be applied on assets of the network. The user interface module 414 can include program instructions, such as options module 440 and input module 442, to facilitate user-defined security policies and risk level grouping. For example, the options module 440 can provide the configuration options, such as selection of risk levels to apply to a security policy, and the input module 442 can receive and/or identify the selections and definitions to be used by the policy module 404 and the group module 406 to define security policies 460 and groups 468.

The policy module 404 can include program instructions, such as a criteria module 444 and a level module 446, to maintain a plurality of security policies 460. The criteria module 444 can receive the settings, components, and other attributes 456 of a network security device to identify and configure the network security device based on a security policy defined by user input 452. The level module 446 can associate a risk level 458 with the security policy based on the input 452 of the user. For example, a user can define an evaluation score structure and associate a range of the evaluation scores to a particular security policy.

To provide the enforcement based on the user input (e.g. apply the requested security policies), a network security device of the network can be maintained. For example, a network security device to enforce a security policy can be configured with the security policy when the use input 452 is received and/or when the risk assessment is made available to the risk assessment module 408.

The group module 406 can include program instructions, such as a relationship module 448 and a division module 450, to divide the security policies 460 into groups for enforcement. The relationship module 448 can receive a relationship between a plurality of security policies 460 and a plurality of groups 468 from the user input 452. For example, the relationship module 448 can receive and identify the relationship provided in a map 462 from the user input 452 defining the relationship among the plurality of security polices 460 and the plurality of groups 468. Based on the relationship of the security policies 460, the division module 450 can create a number of groups 468 based on the relationship of the security policies 460. For example, if the security policies 460 are mutually exclusive, the group module 406 can create one group for each security policy. For another example, if the security policies 460 are not mutually exclusive, the group module 406 can create a group for every combination of the plurality of security policies 460. For yet another example, a set of security policies can be assigned to a group or multiple groups. Alternatively or in addition, the user input 452 can directly define the security policies 460, provide the parameters to divide the groups 468, and define the relationship among the security policies 460 and the groups 468. The group module 406 maintains the risk level 458 associated with each group.

The groups 468 are organized and assets can be maintained in the groups by the group module 406. The assets of the network can be assigned to a group based on the groups 468 maintained by the group module 406 and the risk level 458 associated with each group.

The assignment module 410 can include program instructions, such as an inspection module 472 and an evaluation module 474, to determine which security policy to enforce on the traffic 464 based on the groups 468. When traffic 464 is communicated over the network, the assignment module 410 can intercept the traffic 464 for analysis. The inspection module 472 can inspect the packet information (e.g. header information and/or payload) to identify an asset associated with the traffic, such as the source or destination of the traffic. The inspection module 472 can inspect the network traffic's contents at any layer of the network stack and any part of the payload (e.g. the application layer). The assignment module 410 can receive the risk assessment 466 associated with the identified asset. The evaluation module 474 identifies the group that the traffic 464 is assigned based on the risk assessment 466 associated with the identified asset.

The security policy is enforced on the traffic 464 via an action module (not shown). Enforcement 470 can include blocking the traffic 464, allowing the traffic 464, redirecting the traffic 464, or other management of the traffic 464 based on the security policy. For example, the traffic can flow through an in-line network security device configured with a particular security policy when the risk assessment 466 associated with the traffic 464 achieves the risk level of the security policy enforceable by the network security device (e.g. based on the group assignment). The traffic may flow through or otherwise observed (such as via an IDS) by multiple network security devices that may be configured with the same or different sets of security policies and/or groups. The risk level of the security policy is achieved based on the risk level definition. For example, if the risk level is set as particular value on a scoring system, the risk assessment score achieves the risk level by meeting or exceeding the particular scoring system value associated with the risk level. For another example, the risk level may be a category (such as "high") associated with a range of values of a risk scoring system and the risk assessment of an asset achieves the risk level when the score of the risk assessment is within the range of values. For yet another example, a user can define the scoring system and the risk levels to improve flexibility where the risk assessment achieves a flexible security policy when the risk assessment is below a vulnerability score set by the user.

Figure 5:
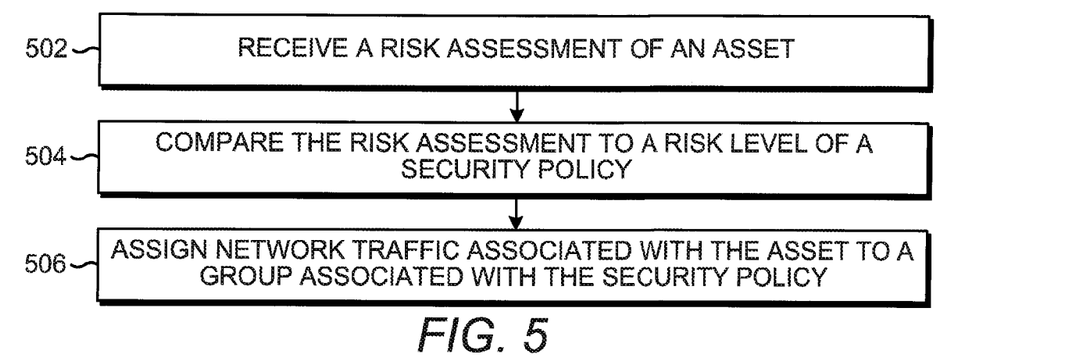
FIGS. 5 and 6 are flow diagrams depicting example methods of maintaining security of a network.
Figure 6:
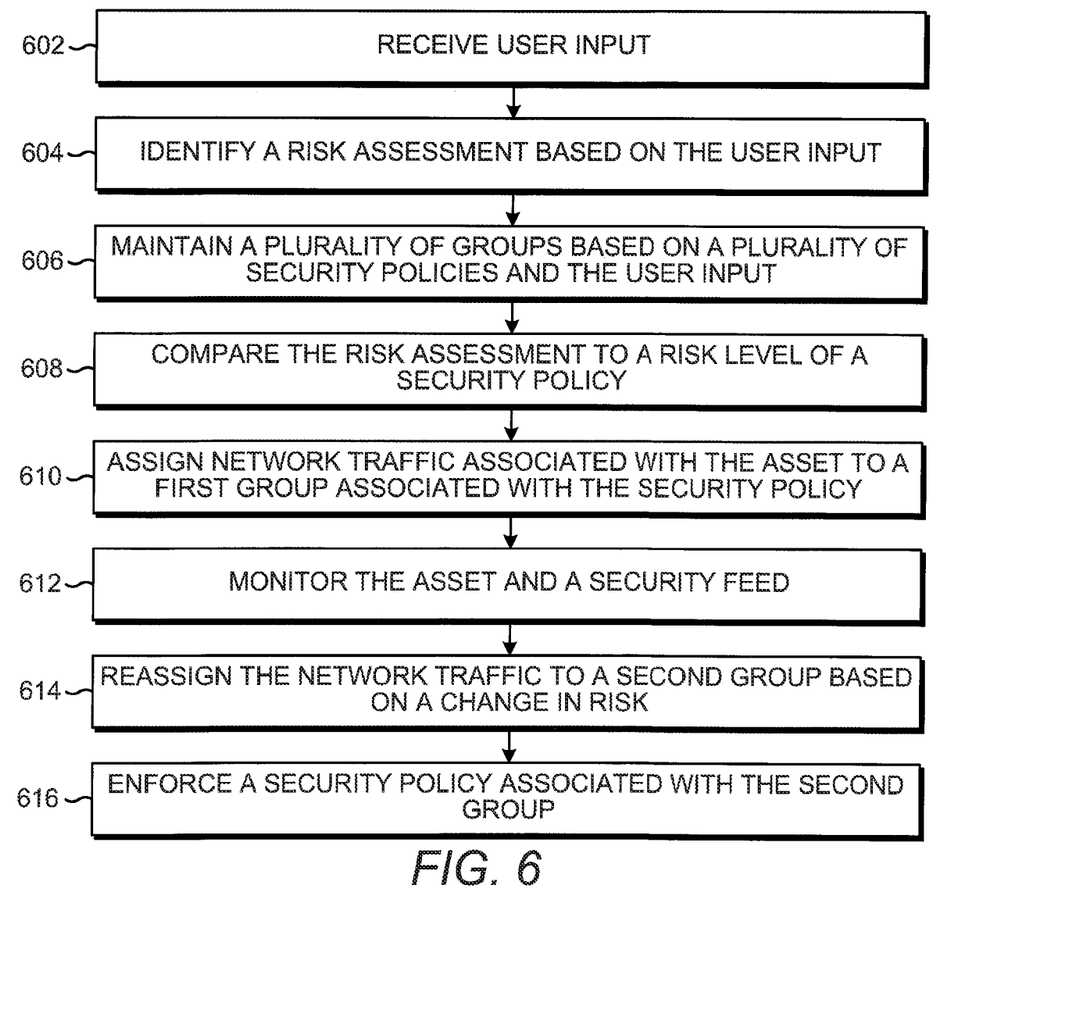

FIGS. 5 and 6 are flow diagrams depicting example methods for maintaining security of a network. Referring to FIG. 5, a risk assessment of an asset is received at block 502. For example, a network security device can receive a risk assessment associated with an asset via an administrative user, a security feed, or an external source. For another example, the risk assessment can be received based on one of a schedule or an event. At block 504, the risk assessment is compared to a risk level of a security policy. Network traffic associated with the asset is assigned to a group associated with the security policy when the risk assessment achieves the risk level of the security policy at block 506. In this manner, network traffic is organized to enforce an appropriate security policy based on the risk associated with the traffic. If an asset has an unknown risk assessment, a default security policy can be employed. By providing groups for network traffic, assets of a network can be changed (or change in riskiness) and security policies can appropriately adapt. For example, the network can expand via a burst into a public cloud or addition of data servers and the security policy can be dynamically applied to the change in network assets rather than statically assigning the IP addresses of each new asset into the security protocol.

FIG. 6 includes blocks similar to blocks of FIG. 5 and provides additional blocks and details. In particular, FIG. 6 depicts additional blocks and details generally regarding receiving user input, maintaining groups, monitoring, and enforcing a security policy. Blocks 604, 608, and 610 are similar to blocks 502, 504, and 506 of FIG. 5 and, for brevity, their respective descriptions are not been repeated.

At block 602, user input is received. The security policies, risk levels, risk assessments, and groups can be defined by a user, such as an administrator, to ensure the security polices adapt the risk in a manner desired by the user. Allowing the grouping to be defined by the user allows for enforcement of security policies based on how risk is evaluated by the user. For example, a user could define risk of a particular class of assets to be no risk because the asset is completely trusted by the user (i.e. the asset only provides presentation layer logic that does not affect functionality of a service) or define a high risk to a particular class of assets, such as assets that hold personal data. At block 604, the risk assessment can be identified based on the user input received at block 602.

At block 606, a plurality of groups is maintained based on a plurality of security policies and the user input. As mentioned above, the user input can define security policies and the relationship among the security policies and the groups based on risk level. Thus, when the risk assessment of an asset is compared to the risk level of a security policy at block 608, the network traffic associated with the asset is assigned to a group associated with the security policy at block 610. The network traffic can be assigned to a group based on security criteria in addition to the risk level. Examples of security criteria include context and/or characteristics of the network traffic as well as context and/or characteristics of an asset, an application, and/or resource related to the network traffic. In this example, the network traffic is assigned to a first group based on a first risk level associated with the traffic (based on an asset) and then reassigned, at block 614, to a second group based on a change in risk (e.g. a change in the risk assessment of the asset). The reassignment can be based on monitoring the asset and/or monitoring a security feed at block 612. For example, the security feed can push out an announcement about a new vulnerability associated with an asset of the network and that can initiate a change of the risk assessment to a higher level than previous. Thus a change in the security feed can result in a change in the risk assessment (e.g. the security feed announces previous vulnerability is not as risky as previously thought) or a change in the risk level associated with a security policy (e.g. the administrator determines to apply the security policy, such as deep packet inspection, to a different level of risk). At block 616, the security policy associated with the second group is enforced by a network security device based on the risk assessment of the asset associated with the network traffic.

Although the flow diagrams of FIGS. 4-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope the following claims.

What is claimed is:

1. A security system comprising at least one processor and memory, the memory storing instructions that when executed by the at least one processor cause the security system to:
   maintain a plurality of security policies, each security policy of the plurality of security policies comprising a risk level that indicates an amount of riskiness the security policy is to be applied;
   maintain a plurality of groups, each group of the plurality of groups being associated with a security policy of the plurality of security policies;
   receive a risk assessment of a computing device from a security feed that indicates a vulnerability of the computing device;
   after receiving the risk assessment of the computing device, assign network traffic associated with the computing device to a first group of the plurality of groups in response to the risk assessment of the computing device satisfying a risk level of a first security policy of the plurality of security policies associated with the first group;
   in response to the network traffic associated with the computing device being assigned to the first group, apply the first security policy against the network traffic associated with the computing device;
   receive a subsequent risk assessment of the computing device from a subsequent security feed that indicates a change in the vulnerability of the computing device;
   after receiving the subsequent risk assessment of the computing device, reassign the network traffic associated with the computing device to a second group of the plurality of groups in response to the subsequent risk assessment of the computing device satisfying a risk level of a second security policy of the plurality of security policies associated with the second group; and
   in response to the network traffic associated with the computing device being reassigned to the second group, apply the second security policy against the network traffic associated with the computing device.

2. The security system of claim 1, wherein the instructions stored in the memory, when executed by the at least one processor, cause the security system to:
   maintain a relationship between the first group and the risk level of the first security policy; and
   maintain a relationship between the one second group and the risk level of the second security policy.

3. The security system of claim 1, wherein the instructions stored in the memory, when executed by the at least one processor, cause the security system to:
   maintain a map of the plurality of security policies to the plurality of groups based on a user input.

4. The security system of claim 1, wherein the instructions stored in the memory, when executed by the at least one processor, cause the security system to
   notify an assignment engine when the risk assessment of the computing device changes,
   wherein each of the risk level of the first security policy and the risk level of the second security policy is a categorical division among combinations of computing device configurations and operation context, and wherein each of the risk assessment and the subsequent risk assessment is an evaluation score assigned to the computing device based on a configuration of the computing device and a context of operation of the computing device.

5. A non-transitory readable storage medium storing a set of instructions that, when executed by a processor resource of a security system, cause the security system to:

maintain a plurality of groups based on a plurality of security policies, each security policy of the plurality of security policies comprising a risk level that indicates an amount of riskiness the security policy is to be applied;

receive a risk assessment of a computing device, the risk assessment indicating a vulnerability of the computing device;

assign the computing device to a first group of the plurality of groups in response to the risk assessment of the computing device satisfying a risk level of a first security policy of the plurality of security policies associated with the first group;

in response to assigning the computing device to the first group, apply the first security policy to network traffic of the computing device;

receive a subsequent risk assessment of the computing device, the subsequent risk assessment indicating a change in the vulnerability of the computing device;

reassign the computing device to a second group of the plurality of groups in response to the subsequent risk assessment of the computing device satisfying a risk level of a second security policy of a plurality of security policies associated with the second group; and in response to the computing device being reassigned to the second group, apply the second security policy to the network traffic of the computing device.

6. The medium of claim 5, wherein the set of instructions, when executed by the processor resource, cause the security system to:

receive user input to define a corresponding risk level for each of the plurality of security policies.

7. The medium of claim 5, wherein the set of instructions, when executed by the processor resource, cause the security system to:

receive the risk assessment; and assess a risk factor of the computing device based on the risk assessment.

8. The medium of claim 7, wherein the set of instructions, when executed by the processor resource, cause the security system to:

receive the risk assessment from an administrator, a security feed, or an external source.

9. The medium of claim 5, wherein the set of instructions, when executed by the processor resource, cause the computer system to:

compute the risk assessment of the computing device based on a schedule, a system event, a network event, or an event of an external source.

10. A method of maintaining security of a network, the method comprising:

comparing a risk assessment of a computing device to a risk level of a security policy, the risk assessment comprising a first score of a risk scoring system and the risk level comprising a second score of the risk scoring system, the risk assessment indicating a vulnerability of the computing device and the risk level indicating an amount of riskiness the security policy is to be applied;

monitoring network traffic associated with the computing device;

assigning the network traffic associated with the computing device to a group associated with the security policy in response to the risk assessment achieving the risk level of the security policy based on the risk scoring system;

in response to assigning the network traffic associated with the computing device to the group associated with the security policy, applying the security policy to the network traffic associated with the computing device;

comparing a subsequent risk assessment of the computing device to a risk level of another security policy, the subsequent risk assessment of the computing device indicating a change in the vulnerability of the computing device;

reassigning the network traffic associated with the computing device to another group associated with the another security policy in response to the subsequent risk assessment achieving the risk level of the another the security policy based on the risk scoring system; and in response to reassigning the network traffic associated with the computing device to the another group associated with the another security policy, applying the another security policy to the network traffic associated with the computing device.

11. The method of claim 10, further comprising:

receiving user input to define the risk level of the security policy and the risk scoring system.

12. The method of claim 11, wherein each of the risk assessment and the subsequent risk assessment of the computing device is based on the user input and one of a schedule, an event, and an external source.

* * * * *

UNITED STATES PATENT AND TRADEMARK OFFICE
CERTIFICATE OF CORRECTION

PATENT NO. : 10,554,691 B2  
APPLICATION NO. : 15/388876  
DATED : February 4, 2020  
INVENTOR(S) : Meyers et al.

Page 1 of 1

It is certified that error appears in the above-identified patent and that said Letters Patent is hereby corrected as shown below:

In the Claims

Claim 2, Column 12, Line 54, after "between the" and before "second group", delete "one"

Signed and Sealed this
Nineteenth Day of May, 2020

Andrei Iancu
*Director of the United States Patent and Trademark Office*